United States Patent
Samid

(10) Patent No.: US 10,608,814 B2
(45) Date of Patent: Mar. 31, 2020

(54) EQUIVOE-T: TRANSPOSITION EQUIVOCATION CRYPTOGRAPHY

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 116 days.

(21) Appl. No.: 14/714,328

(22) Filed: May 17, 2015

(65) Prior Publication Data

US 2016/0337120 A1    Nov. 17, 2016

(51) Int. Cl.
*H04L 9/06* (2006.01)
*H04L 9/08* (2006.01)

(52) U.S. Cl.
CPC .......... *H04L 9/0631* (2013.01); *H04L 9/0618* (2013.01); *H04L 9/0819* (2013.01); *H04L 9/0838* (2013.01); *H04L 2209/56* (2013.01)

(58) Field of Classification Search
CPC .............................. H04L 9/0618; H04L 9/28
See application file for complete search history.

(56) References Cited

U.S. PATENT DOCUMENTS

| | | | | |
|---|---|---|---|---|
| 5,148,485 | A * | 9/1992 | Dent | H04L 9/0662 380/262 |
| 6,038,317 | A * | 3/2000 | Magliveras | H04L 9/302 380/28 |
| 6,769,063 | B1 * | 7/2004 | Kanda | H04L 9/002 380/29 |
| 7,747,011 | B2 * | 6/2010 | Shirai | H04L 9/14 380/28 |
| 7,761,712 | B2 * | 7/2010 | Moskowitz | G06T 1/0021 380/28 |
| 2002/0076044 | A1 * | 6/2002 | Pires | H04L 9/0891 380/37 |
| 2005/0183072 | A1 * | 8/2005 | Horning | G06F 21/14 717/140 |
| 2008/0028474 | A1 * | 1/2008 | Horne | G06F 21/16 726/27 |
| 2009/0103716 | A1 * | 4/2009 | Shirai | H04L 9/0618 380/28 |
| 2009/0138715 | A1 * | 5/2009 | Xiao | H04L 9/0838 713/171 |
| 2010/0002872 | A1 * | 1/2010 | Shibutani | H04L 9/0631 380/28 |
| 2010/0033305 | A1 * | 2/2010 | Korgaonkar | H04K 3/28 340/10.1 |
| 2012/0027201 | A1 * | 2/2012 | Fujisaki | H04L 9/3073 380/28 |
| 2012/0033809 | A1 * | 2/2012 | Huang | H04L 9/001 380/46 |
| 2013/0259224 | A1 * | 10/2013 | Lee | G06F 7/766 380/28 |
| 2015/0310219 | A1 * | 10/2015 | Haager | G06F 21/602 713/165 |
| 2015/0341172 | A1 * | 11/2015 | Gomez | H04L 9/0838 380/285 |
| 2015/0381205 | A1 * | 12/2015 | Zhang | H03M 13/116 714/773 |
| 2016/0254909 | A1 * | 9/2016 | Garcia Morchon | H04L 9/0838 380/46 |

OTHER PUBLICATIONS

Cormen et al., "Introduction to Algorithms" Pub. Date: 2002, pp. 1-1180.*
Rivest, "Chaffing and Winnowing", Pub. Date: 1998, pp. 1-9.*
Hussain et al., "Key Based Random Permutation", Pub. Date: 2006, pp. 419-421.*
Bellare et al., "The Security of Chaffing and Winnowing" Pub. Date: 2000, pp. 1-20.*
Dowdy et al., "Josephus Permutations", Pub. Date 1989, pp. 125-130.*

* cited by examiner

*Primary Examiner* — Kenny S Lin

(57) ABSTRACT

Equivoe-T complements its erosive cryptographic intractability with durable cryptographic equivocation. The captured ciphertext C generated through plaintext P using key K, may also be generated via a 'fake plaintext' P'≠P using a different key, K'≠K, presenting the cryptanalyst with a conclusive doubt as to the identity of the true plaintext. Prospectively there will be numerous plausible non-overlapping plaintext candidates, all guarding the identity of the true plaintext.

4 Claims, No Drawings

EQUIVOE-T: TRANSPOSITION EQUIVOCATION CRYPTOGRAPHY

1.0 INTRODUCTION

Our society is becoming more and more dependent on encryption. We all share an information highway, we are exposed to each other's communication, and the only way to maintain the civil order is to use viable encryption. Encryption is our only means to prevent contamination of data, reports, orders and instructions. A successful cryptanalyst will steal identities of the people who run the society, mutilate and fake their messages, and sow paralyzing havoc throughout cyberspace, similarly affecting out old "real" space of living.

So this is no longer about being embarrassed on account of a spousal unflattering letter that was crypto-cracked, not even about a deceitful plan to take an unfair advantage in business. This is about operational orders of the highest level—orders that may be modified and faked. Sensitive decisions may be turned around by contaminating their supporting information. Battles may be botched, wars may be lost, victory denied, subjugation—unavoidable; for no deeper reason than what accelerated Nazi collapse in WW-II—compromised encryption.

Analyzing our crypto strategy in light of this fundamental vulnerability, the conclusion is alarming. All the first-row ciphers we use today are known to be breakable, and may in fact have already been broken by a savvy cryptanalyst carefully hiding this fact (Much as Churchill, at great sacrifice, hid the cracking of the German cipher in WW-II). Like warning about a pending earthquake—it is easy, and tempting, to ignore, up to the very second when it is unleashed because everything looks very normal and cozy. The people in charge, too often look the other way in the face of this alarm.

Here is an attempt, though, to take this alarm head on. Let's use the phrase 'erosive intractability' to characterize modern cryptography. Mathematically, the key being much shorter than the plaintext, the ciphertext necessarily commits to the single plausible plaintext that generated it. This statement holds regardless of the nature or particulars of the cipher. In other words, given a ciphertext C generated by a plaintext P using a Key $|K|<<|P|$, there is only negligible likelihood for another plaintext $P'\neq P$ to find a different key, $K'\neq K$, that will encrypt $P'$ to C. It is therefore that in the worst case a cryptanalyst will employ the brute force approach, and eventually find K. As computers get faster the brute force approach is more effective. As math insight is being extracted, then an accelerated brute force may be employed, or a new mathematical understanding may point to operational short cuts, or to head on cracking of the intractability.

In other words, by the end of the day, the ciphertext will point unequivocally to its generating plaintext. All that we can do is to hope and pray that this erosive intractability will last for as long as extracting the plaintext may be harmful to our interests. But as we analyzed above, so much depends on encryption today that this commitment of a ciphertext to its generating plaintext should be regarded as unacceptable.

It is important to note that this commitment holds only for high-entropy plaintexts, like contextual messages, however most ciphertexts of interest hold contextual messages.

Since the plaintext that we need to encrypt is given, the only way to escape this lack of equivocation is to focus on the key, and redefine it such that larger keys can be conveniently used. Let us define a key $K_{e0}$ as the smallest key that allows a situation where a ciphertext C generated by a plaintext P, would also be the result of encrypting a different plaintext $P'\neq P$, using $K'_{e0}\neq K_{e0}$, such that the plausibility of $P'$ will be non-dismissive. Such a situation will insure durable equivocation. Even a most wise and most diligent cryptanalyst will face this daunting equivocation: was the user sending P, or was she sending P'?

And we shall also try to find a practical way to use even larger keys so that three or more plausible plaintexts with greatly deferring implications will confound even the most powerful cryptanalyst. In other words, this effort here is focused on means to establish equivocation based encryption to escape from the alarming vulnerability of today's cryptography—the weakness of intractability subject to relentless erosion.

Equivocation based cryptography is not new at all. In 1917 Gilbert S. Vernam has patented his famous "One Time Pad" cipher which exhibits so much equivocation that knowledge of the ciphertext only limits the size of the plaintext, not its content: anything that can be written with the same number of bits as the Vernam ciphertext will qualify as a possible plaintext. Vernam per se was quickly abandoned by cryptographers at the early years of the last century because it called for a key as large as the message: $|K_{Vernam}|=|P|$, and its practice was overbearing[1].

The present insight is that Vernam is an 'overkill' of equivocation. We may use smaller keys, creative keys, to afford us a useful measure of equivocation. When it comes to equivocation—every little bit helps, especially considering the alarming state of zero equivocation today.

Ahead we present an illustration for the above discussion, followed by an overview of two cipher categories offering partial equivocation. One is based on a graph as a key (Equivoe-G), and one based on raw transposition, (Equivoe-T).

1.1 ILLUSTRATION

Imagine a situation where Alice and Bob use any common modern cipher, and Alice sends Bob the message: $P_0$="We shall act before the end of the month" and let it be obvious what this "act" is. Should Carla intercept the respective ciphertext, and be in the know as to which cipher method was used, then she would be able to apply brute force analysis, or any other cryptanalysis, and extract $P_0$. Once so, Carla will have no doubt that $P_0$ was the message Alice sent Bob.

Had Alice used Vernam cipher then Carla would have had to list a myriad of messages of the same length as $P_0$, and each such message would have come with its own valid key. An example to such alternative message $P'$="a powerful factor will come to play for us". $|P_0|=|P'|$ namely the length of the two plaintexts are the same, and both of these messages may encrypt to the same ciphertext captured by Carla. Carla will suffer from this equivocation, which in fact extends to a myriad of other possible and plausible messages.

Alice could also use a "partial equivocation cipher" which allows the captured ciphertext, C, to decrypt to only two more messages: $P_1$="We shall act after the end of the month", and $P_2$="We decided not to act at all". Carla, analyzing the captured ciphertext, C, and aware of the cipher used by Alice, will extract $P_0$, $P_1$, and $P_2$. Suppose now she allocated plausibility chances for the three plaintext candidates: $p_0=25\%$, $p_1=25\%$, and $p_2=50\%$ (small p here indicates chance). In that case Carla would conclude that the talk about "Act" may or may not happen (50% chance for either way), and if the act happens it can happen any time: 50% chance for it to happen either by the end of the month or after that. Clearly Carla faces a state of confusion and equivocation here, not as broad-based as with Vernam, but much more confusing and mysterious than the case with a committed secret. As things stand, Carla does not know whether a certain Act will take place or not, and if it does take place, whether it would take place before or after the end of the month.

Suppose even the more extreme case where $p_0=80\%$ and $p_1=p_2=10$. In that case Carla will assume that the act will take place before the end of the month. Yet, unlike the committed ciphertext case analyzed above, Carla will sustain a non-negligible equivocation with respect to Alice starting her action.

Such partial, yet non-negligible equivocation is our subject of interest here. Since the key for committed ciphers is small while keys to fully equivocation ciphers like Vernam are message-long, it stands to reason that keys used in equivocation defense are in between in length. This fact allows for one clear principle for generating partial equivocation: employing a cipher where the size of the key is (i) part of the secrecy of the key, and where (ii) the computational burden for encryption and decryption is not meaningfully dependent on the size of the key. The latter will generate daunting equivocation for Carla; she would not know if the size of the key is "Vernam's", almost "Vernm", or never quite reached the Vernam;s scale.

1.2 EQUIVOE-G: GRAPH BASED EQUIVOCATION

Equivoe-G (U.S. Pat. No. 6,823,068) is based on a map serving as a key. Encryption amounts to replacing a 'trip' on the map from being expressed as a series of visited vertices (plaintext) to being expressed as a series of walk-though edges (ciphertext). The computational burden is proportional to the size of the plaintext, regardless of the size of the map (the key). The map may be made very small, so that the "trip" expressed both by the plaintext and the ciphertext is drawn as a path of a bouncing ball inside a tumbling sphere, and in that case it is a matter of intractability to deduce the map from more and more ciphertext material. But then again, the map may be made so big that no vertix is ever revisited, and no edge is passed through twice or more, so that a given ciphertext so encrypted can decrypt to any plaintext of choice, simply by drawing a proper map.

Equivoe-G therefore provides equivocation at will.

1.3 EQUIVOE-T: TRANSPOSITION EQUIVOCATION—THE PRINCIPLE

Let $P_1$ and $P_2$ be plaintexts of non-overlapping meaning, where $P_1$ features $n_1$ words $U_1, U_2, \ldots U_{n1}$, and $P_2$ is comprised of $n_2$ words $V_1, V_2, \ldots V_{n2}$. We may construct a combined plaintext P:

$P = P_1 \%\#\% P_2 = U_1, U_2, \ldots U_{n1}, \%\#\%, V_1, V_2, \ldots V_{n2}$

P is a concatenation of $P_1$ and $P_2$, separated by the word: '%X%'.

We use a transposition algorithm, T to transpose P into a ciphertext C based on encryption key K:

$T_K(P) = C$

C may be decrypted using the reverse encryption, $R = T^{-1}$:

$P = P_1 \%X\% P_2 = R_K(C)$

We shall refer to $P_1$ as the 'payload' the plaintext which was in need of security and confidentiality, and we shall refer to $P_2$ as the 'decoy'—the plaintext that is used to confuse the cryptanalyst to think of it as the payload. The intended reader of the reverse encryption, R, will be in the know, and will interpret the plaintext left of the separator as the payload. She will dismiss the separator and everything right of it.

Suppose now that there exists a different key K' and it will decrypt C such that the result happens to be switching the roles of the payload and the decoy:

$P_2 \%X\% P_1 = R_{K'}(C)$

A cryptanalyst thoroughly exploring all possible keys will identify K and K' as possible and plausible keys. Only that one key will lead the cryptanalyst to conclude that $P_1$ is the payload, as indeed is the case, while the other key will lead the cryptanalyst to conclude that $P_2$ is the payload—and thereby fall into the trap set forth by the message writer. This is equivocation per se.

We may extend the above configuration to several decoys: $D_1, D_2, \ldots D_h$. Alice will encrypt: Payload %X% $D_1$, $D_2, \ldots D_h$, leaving the cryptanalyst with (h+1) possibilities, since for any i=1, 2, . . . h there is a likelihood for the encrypted plaintext to be:

$P = D_i \%X\%$ (some order of the other h−1 decoy plus the payload)

Provided each option above may be matched with a transposition key which transposes it to the given ciphertext.

There might be several more keys $K_1, K_2, \ldots K_g$, such that each $K_i$ that would decrypt C to a combination of words from the payload mixed with a combination of words from the decoy, all appearing left of the '%X%' separator, in a way that upon reading these words in order, one may identify a plausible payload which the message writer could have been encrypting for her reader. There may be a large number of such plausible payload candidates: $P_1$, $P_2, P_3, \ldots P_m$, each with its likelihood to be the actual payload: $p_1, p_2, \ldots p_m$. The Shannon entropy computable from these likelihoods will reflect the residual entropy confounding the cryptanalyst.

Our purpose here is to investigate how a message writer could use this Transposition Equivocation principle to effect maximum entropy (equivocation) to confound the cryptanalyst while doing so with maximum efficiency and minimum of effort and inconvenience.

2.0 ANALYSIS OR EQUIVOE-T ENCRYPTION

For transportation equivocation (Equivoe-T) to work efficiently it is necessary to design a transposition algorithm, T, that would be complete, namely: Given a pre-transposition image, P, and given any transposition thereto, P*, there will be a key, K, to be used in conjunction with T such that:

$P^* = T_K(P)$

This requirement is necessary to insure that a cryptanalyst will be confounded by the payload/decoy disinformation. In particular be confounded by a variety of plausible payloads, each of them could have been used to generate the captured ciphertext, C, as C is nothing more than a permutation (transposition) of each one of the plausible plaintext candidates.

Using the definitions in the introduction, the number of distinct keys necessary for completeness is: $N(k) = (n_1 + n_2 + 1)!$ where we regard the separation mark '%X%' as a single permutation (transposition) entity. Of course the payload/decoy separation mark may be arbitrarily chosen. $n_1$ is the number of permutation elements in the payload, and $n_2$ is the number of permutation elements in decoy.

In this analysis we will not specify the size of the permutation entities: they will be regarded as strings of symbols, not necessarily of the same length, or alternatively they may be regarded as a single symbol, or even as a bit. For example, the pre-transpositon image (PTI) may be written as:

PTI=Go North! %X% Go South!!

Counting worlds we have $n_1=2$, and $n_2=2$. But viewing the same as a string of individual symbols we have: $n_1=10$ (counting 'spaces' as symbols), and $n_2=11$. We shall denote the permutation entities as 'words'.

To effect this Equivoe-T idea we now need to develop an effective mechanism for building a decoy, and devising a convenient, complete transposition algorithm T. Once done Alice could send Bob an encrypted payload which Bob will readily decrypt using his agreed upon key, while Carla, the cryptanalyst, would face irreducible equivocation—two or more payload candidates, she would not be able to sort out, without additional information.

2.1 BUILDING A DECOY

The issue of a decoy cannot be removed from the circumstances in which the encryption happens. The lowest bar is 'formal legal deniability', the highest bar is 'subject matter confusion'. Above formal legal deniability we have 'consideration legal deniability', and below the 'subject matter confusion' we find 'statement/counter-statement confusion' and below that 'meaningful entropy' state.

We shall analyze the above circumstances ahead, but focus here on a range of operational alternatives: 'generic decoy' being the lowest, and 'high-intelligence decoy' being the highest. In between we shall find 'medium intelligence decoy' and 'low intelligence decoy'. The necessary intelligence may be human or artificial.

The most powerful, and most convenient case is where Alice who authors the payload, leaves the decoy building to the computer, remaining unaware of the decoy as such, and the same oblivion is the lot of Alice's intended reader, Bob—who just reads the payload, unaware that the at-risk ciphertext carried a decoy.

In some respect the decoy may be regarded as part of the encryption key, to satisfy minimum size key requirement, but such key material is much easier to handle.

2.1.1 Decoy Circumstances

We discuss the following circumstances:
formal legal deniability
consideration legal deniability
statement/counter-statement confusion
subject matter confusion Formal legal deniability is the case where the communicating parties argue that there is a formal possibility that the decoy was the payload, and hence it cannot be dismissed beyond a reasonable doubt. The consideration legal liability is a higher bar: the decoy must qualify as a payload on the basis of some reasonable argument, or say there must be a meaningful entropy, or equivocation in the case. The next level is where a statement and its counter statement are each sufficiently likely that one cannot be sure which one was the payload. The highest level is when the decoy offers plausible alternatives of a different subject matter than the payload.

2.1.1.1 Illustration

A suspected embezzler used Equivoe-T and sends out a ciphertext C, that notifies its intended reader P="I have paid Jack $1,000,000 in cash". Indeed key $K_{true}$ decrypts C into:
P="I have paid Jack $1,000,000 in cash %X% $50,000 $3000 $10"
of which the intended reader regards only the part left of the divider '%X%'.

However, the embezzler prepares key $K_{decoy}$ that decrypts C into:
P'="I have paid Jack $10 in cash %X% $1,000,000 $50,000 $3000 $10"

When challenged by the police, the embezzler uses $K_{decoy}$ to argue that P' is his message. The embezzler enjoys formal legal deniability because the prosecutors cannot prove that C represents P and not P'. This argument will not hold under 'consideration legal liability' because it is not plausible that one will encrypt an ordinary message regarding $10. However, if the embezzler will claim that he sent the same message regarding $50,000, then the decoy gains plausibility, and is not easily dismissed.

A statement/counter-statement case is demonstrated by the following:
P="I have paid Jack $1,000,000 in cash %X% I have never paid Jack anything Jack paid me $1,000,000 in cash"

This would challenge the cryptanalyst with three mutually exclusive possibilities.

The embezzler could also encrypt the following:
P="I paid Jack $1,000,000 in cash %X% I forged a check, I blackmailed my adulterous neighbor Here the police is facing a subject matter confusion as to what the embezzler is talking about.

The embezzler has a stronger argument if he can show the key that matches his claim for the identity of the payload, but this is not a must. The embezzler could say: I have lost my key, but based on the nature of Equivoe-T, there must be a key that connects the captured ciphertext to the message I claim I sent.

2.1.2 Decoy Building Operational Alternatives

We analyze the following options:
Generic Decoy
low-intelligence Decoy
Medium-Intelligence Decoy
High Intelligence Decoy The source of the intelligence required for an effective decoy may be human, or machine. In other words, the payload writer, or someone on his behalf, would construct a decoy based on insight into the circumstances that call for encryption, or, alternatively, an artificial intelligence program will take on this task, and the message writer may be unaware of what the decoy says.

2.1.2.1 Generic Decoy

A generic decoy will be independent of the payload by definition. Three modalities are presented:
letters based decoy
words based decoy
sentences based decoy For each of these modalities there will be size decision to be made. Obviously, the larger the decoy, the greater the chance for the plaintext to harbor more false payload candidates, which are of meaningful probability. Alas, the larger the decoy, the more data is to be processed (encrypted, and decrypted), and the more cumbersome the computation. Also, the less sophisticated the contents of the decoy, the more of it is called for.

The letter based decoy is comprised of adding letters from the payload alphabet such that they would combine to words that in turn combine into statements which will appear plausible under the prevailing circumstances. For a letter based decoy to be effective, the transposition will have to be carried out letter size.

One strategy for letters based decoy is to add all the letters of the alphabet, corresponding to their frequency in the language in which the payload is written. For example, for a payload in English the decoy will be comprised of 14% the letter "e" since that is its frequency in English.

Words Based Decoy:

In this modality the decoy will be comprised of words common in the payload language. Words of negation, and opposition are useful; same for words of qualification, and words implying fiction. A sample list:

no, false, untrue, never, no-way, it-is, it-is-not, as-if, would-appear, a wild thought, not to be accused of seemingly, unlikely It is easy to see how such words could fit into a payload statement and negate it, or qualify it into a harmless content.

For example: Payload="I did give George a false alibi" Decoy may be comprised of "not", "true", "imagine that" and such like.

Sentence Based Decoy:

Decoy could be constructed from generically 'plausible' sentences, each of which would qualify as payload. For example: "I am very embarrassed about the whole situation, and it is only you that I can share this with" or "I have been having an affair, and I am afraid to get caught".

Nested Decoys:

Let's consider a body of text included in a folder. The folder is comprised of several files, and each file is divided to paragraphs of texts, comprised of sentences, words, and finally letters. This body of text can be Equivoe-T processed nest-wise.

The Equivoe-T user may construct one or more folders next to the "payload" one and use Equivoe-T to confuse the cryptanalyst as to which folder is the one with the protected message. The same transposition confusion may be applied to the various files in the folder—some decoy files created. And then on, the paragraphs in each file may be complemented with decoy paragraphs, and similarly decoy sentences will be added and used in an Equivoe-T confusion in each paragraph. Next—at words level (adding decoy words) in each sentence, and finally some decoy letters for each word.

Such layered equivocation builds up as very strong intractability.

2.1.2.2 Low-Intelligence Decoy

Low intelligence decoy is constructed based on casual reference to the contents of the payload. It may be constructed from the generic version with contents-sensitive additions. So if the payload talks about "bank robbery", the decoy will talk about "cashing a check in the bank", or a "plot for a financial fiction".

There are two strategies for low-intelligence decoy (LID): (i) similarity, and (ii) off-topic. The first strategy calls for decoy statements which are as similar as possible to the payload, to make it reasonably hard to determine which is which, and the second strategy calls for plausible statement from a totally different topic, to sow confusion as to which is the payload topic. A decoy may be comprised of parts from each category.

2.1.2.3 High-Intelligence Decoy

In this mode the decoy is built on the basis of the content of the payload and the circumstances that call for its encryption. The more intelligence there is with respect to the mindset, and expectation of the cryptanalyst, the more powerful and confusing can the decoy be, and over time the intelligence that builds such decoys is getting better and more effective.

2.2 DEVISING A CONVENIENT, COMPLETE TRANSPOSITION ALGORITHM

Transposition is often explicitly defined through n binary tuples (i,j) for an ordered set (list) of n elements (also referred to as members, or transposition entities). This set of n binary tuples specifies that the element in position i ($1 \leq i \leq n$) in the pre-transposition permutation is to be found in position j ($1 \leq j \leq n$) in the post transposition permutation. By the nature of transposition every value k ($1 \leq k \leq n$) appears once and only once as a first number in the binary tuple, and the same for the second number in the binary tuple.

Illustration:

the transposition of XYZW to WYXZ will be defined via (1,3), (2,2), (3,4), (4,1), or alternatively: $t_{13}$=X; $t_{22}$=Y, $t_{34}$=Z, and $t_{41}$=Z, namely element $t_{ij}$ is found in position i in the pre-transposition permutation and in position j in the post transposition permutation.

Such a list of n tuples, or a list of n $t_{ij}$ entities will define a key to effect the desired transposition, and by its nature serves as a framework for complete key space. Any possible transposition can be so specified. There are exactly n! combinations of such sets of n binary tuples.

Since the idea here is to use straight transposition as a cipher, we can agree to refer to the pre-transposition permutation as plaintext, denoted as P, and similarly agree to refer to the result of the transposition as the ciphertext C. We shall define P as:

$P=P_n(t_{1*}, t_{2*}, \ldots t_{n*})$ where $P_n$ is a plaintext containing n transposition elements, and $t_{i*}$ is the element positions at spot i in the plaintext, while the asterisk, '*', represents an unspecified position of same element in the ciphertext.

We shall similarly define C as:

$C=C_n=(t_{*1}, t_{*1}, \ldots t_{*n})$ where $C_n$ is a ciphertext containing n transposition elements, and $t_{*i}$, is the element positioned in spot i in the ciphertext, while the asterisk, '*', represents an unspecified position of same element in the plaintext.

We can state:

$(P_n, C_n)=\{t_{ij}\}_{n,n}$ where the right side of this equation represents the n transposition elements each identified as to their position in the plaintext, and in the ciphertext.

Since there are n! permutations, the complete key space will be of size n!:

$|K^c|_n = n!$ where the left side of the equation denotes the size of the key space for a complete transposition cipher.

Since we aim to construct a convenient key for the transposition we may wish to explore other means, not the unwieldy list of n binary tuples. In order to achieve that goal we may wish to explore transposition algorithms which are not necessarily complete. Such an incomplete key, $K^i$ will have a key space that does not cover all possible transpositions:

$|K^i|_n < n!$

We shall therefore present a procedure that will allow such an incomplete key to become complete. We call this procedure 'ghost dressing' for reasons that would become clear shortly. We shall then present such an incomplete cipher, upgrade it with 'ghost dressing' and render it complete.

2.2.1 the Sieve Method: Incomplete Transposition

The basic idea of the sieve method for transposition is to remove elements from the pre-transposition permutation P and use the removed elements to build a different permutation as output. The pattern of removal and the pattern of rebuilding determines the output permutation, C. As P loses elements it resembles a 'sieve', and the process itself is reminiscent of the sieve of Erasmus, and that is the origin of the name of the method.

As long as any removed element from P finds its position in C, then when the process is complete and the P list is emptied out, the rebuilt list, C, is a valid permutation of P.

In the present stage we shall restrict ourselves to a sieve mechanism where one removes the P elements one by one, and in that order one builds up the output list, C.

2.2.1.1 One Element at a Time Sieve

We restrict ourselves for now to a sieve transposition where one removes one element at a time from P, then adds that element to the built-up output permutation, C. Such algorithm is comprised of 2n steps (where n is the number of elements in the permutations): n elements are removed from P one by one, and n elements are added to C, one by one.

We shall further restrict ourselves in this case to sieve algorithms where the building of C is carried out sequentially, namely: the first element removed from P becomes the first element in C, the second element removed from P becomes the second element in C, and in general the i-th element removed from P becomes the i-th element in C.

We shall now add another restriction: the removal of elements from P will be determined via a cyclical counting process. Namely one would count element in P in a cyclical way, to wit: when the counting reaches the end of P (the rightmost element), it would hop back to the first element in P (the leftmost element at the time), and the counting will continue along P, or what is left of it (assuming that some elements were taken out from the ranks beforehand).

Cyclical counting, in general may proceed from left to right, as normally done, or from right to left—the opposite way. If the counting is done in the opposite way, then upon reaching the first element in P, or in what is left of it, one would hop back to the last element in P, or to what is left of it (the current rightmost element), and keep counting backwards (from right to left).

Either way the cyclical counting is finite and when the counting is stopped, it points to one element or another in P. The pointed-to element will then be removed from P and added to C, as the new rightmost element there. P will then lose an element and grow smaller. The direction of counting may be altered after every removal of an element in P. Or it may be altered in some peculiar pattern.

At this stage we will add two more restrictions to define a very simple and basic sieve permutation algorithm: (i) direction of counting remains from right to left, and the counting resumes at the leftmost element after it hits the rightmost element, and (ii) the counting will be limited to a fixed count. In other words, a given fixed positive integer, R, will be used to count elements in P, from left to right, and will remove an element of P after counting R elements in P (the element where the counting stopped is the one to be removed), and then on would place the removed element as the next (rightmost) element in the being built list, C. This procedure completely defines how any P will be transposed to a corresponding permutation thereto. The value of R—to be called "the remover" is the value that determines the output transposition C.

Of course, any of the above restrictions may be removed and the family of valid sieve transposition algorithms will be larger, but for the basic version we shall abide by all the above restrictions. This algorithm will be referred to as the basic sieve algorithm.

Illustration 1: let P=ABCDEFGH (n=8); let the "remover" R=11: the resultant transposition will be: CGEF-BHAD; for R=234 we get: BHECFGDA; and for R=347876 we have: DHBCAFEG.

Illustration 2: let P=ABCDEFGHIJKLMNOPQRSTUVWXYZ; for R=100 we get: VUZHTNMSGDJACRBEYFOQKIXLWP, and for R=8 we get: HPXFOYISCNAMBRGWTLKQVEDUJZ 2.2.1.2 the Basic Sieve Algorithm We shall first observe that the basic sieve algorithm is an incomplete transposition algorithm. We shall then explore some of its properties.

To effect the basic sieve algorithm for transposition of a plaintext P:

$P = P_n = (t_{1*}, t_{2*}, \ldots t_{n*})$

One should employ a positive integer, R (The "Remover"), to count the elements of P by order, beginning with $t_{1*}$, and returning to the leftmost element after reaching the rightmost element of P, or of what is left of it at the time. The element where the counting stops, is then removed from P, and added as the next element in a new permutation, the ciphertext (the ciphertext starts as an empty list). After n rounds of counting R elements per round, all the elements of P have been removed, and P is shrunk to an empty list, and in turn, all these elements appear in the ciphertext list exhibiting a new order. And hence C is a permutation of P.

Let $r_1$ be the first element removed from $P_n$: $r_1 = t_{i*}$. This element will be positioned to become the first element in the about to be built ciphertext, $C_n$:

$r_1 = t_{i1}$

And in general for the j-th element to be removed, $r_j$, we may write:

$r_j = t_{ij}$

Decryption

In order to decrypt $C = \{t_{*1}, t_{*2}, \ldots t_{*n}\}$, one would execute the sieve algorithm on a "plaintext frame", namely:

$P = \{t_{1*}, t_{2*}, \ldots t_{n*}\}$

By so doing (counting with the remover R that created C from P), the decryption agent will first stop her counting at element $t_{i*}$. Since this is the first element it must be the first element in C. In other words:

$t_{i*} = t_{*1} = t_{i1}$

And then one continues: counts R more element in the "P frame", and stop at some element $t_{j*}$, which, by the construction of C, is element $t_{*2}$, or say:

$t_{j*} = t_{*2} = t_{j2}$

And so on; when one applies R for the k-th time and hits on $t_{m*}$, then one writes:

$t_{m*} = t_{*k} = t_{mk}$

And for k=1, 2, ... n one notes that successively, the elements of $C_n$ are placed in $P_n$, and the decryption process is complete. The plaintext frame serves as a placeholder where $t_{i*}$ refers to the initially unknown element at position i in the plaintext. It is noteworthy that decryption is not symmetrical with encryption in as much as decryption is not simply applying the encryption algorithm on the ciphertext. The counting of R elements always takes place over the plaintext. For encryption, known P elements are sorted out in a different order on the ciphertext, and for decryption, the initially unknown elements in P one by one become known from the information on the ciphertext.

2.2.1.2.1 Properties of the Basic Sieve Algorithm

For any pair of plaintext, ciphertext, $(P_n, C_n)$, there are infinite removers: $R_1, R_2, \ldots$ because there are no more than n! permutations.

Every remover, R of the form $R = Q_1 * n + i$, where $Q_1$ is some positive integer, will generate element $t_{i1}$. Every R of the form $R = Q_2 * (n-1) + j - i$, where $Q_2$ is some positive integer will generate: $t_{j2}$, and so on. We regard these equations as the "n sieve equations". For a specific permutation, C, let $R_0$ be the lowest value of R to generate it, then there will be infinite R values: $R_1, R_2, \ldots$ generating the same cipher. satisfying:
$R_i = f(Q_{1i}, Q_{2i}, \ldots Q_{ni})$
where $Q_{ij}$ is an integer for $t_{*j}$, to match to $R_i$ For two successive R values $R_i, R_{i+1}$ we may write, with respect to each $t_{jk}$:
$R_{i+1} - R_i = (Q_{ji+1} - Q_{ji})*(n-k)$ And since the difference between any two Q values is an integer, we may write for any value of $i = 1, 2, 3, \ldots$:
$R_{i+1} - R_i = 0 \mod n-k \ldots$ for $k=1, 2, \ldots m$ Or, in general, for every $m > i$:
$R_m - R_i = 0 \mod n-k \ldots$ for $k=1, 2, \ldots n$
which leads to one clear solution:
$R_m - R_i = (m-i)*n!$ Or alternatively, we may write:
$R_i = R_0 + i*n!$ Albeit, we may also write:
$R_{i+1} - R_i < n!$ because some composite numbers in the series may be replaced by a constituent prime factor, since the other primes are already in the multiplied list. This may be readily shown as follows:

For $n=1$, $R_i = R_0 + i*1$, for $n=2$ $R_i = R_0 + i*1*2$, for $n=3$ $R_i = R_0 + i*1*2*3$, but for $n=4$ $R_i = R_0 + i*1*2*3*2$ because the factor 2 is already present in the multiplication list, so instead of *4, one may add *2 to achieve a number that divides by 4. And so forth, if we write: $R_i = R_0 + i*B$, then we may sequentially construct B values for $n=1, 2, \ldots 20$ as:
$2*3*2*5*1*7*2*3*1*11*1*13*1*1*2*17*1*19*1$ And so for $n=20$, $B = 232792560$, which is much smaller than $20! = 2.432902*10^{18}$ Clearly, for $R=1$ we have $C=P$ "the zero effect".

2.2.2 Ghost Dressing

Given an n element permutation, regarded as the plaintext, $P_n$, we shall associate it with g copies of an element marked '*' which is not used in denoting any of the n elements in $P_n$. We then mix these g add-on elements into P. This creates an ordered set comprising (n+g) elements.

For example: $P_n = UVWXYZ$ will be mixed with 12 add-on elements, all marked as asterisk, creating a list comprised of $6+12=18$ elements, say:
$P^g_n = U*V*W****X*YZ$ Using some incomplete key, $K^i$, one would encrypt $P^g_n$ to the ciphertext permutation, $C^g_n$. (The superscript 'g' denotes a permutation with the add-on elements).

For example:
$C^g_n = ***XUWVZ*Y$

At this stage, all the add-on elements marked as asterisk may be 'washed away' yielding a permutation of the original $P_n$. The net result is that the original $P_n$ was transposed to the resulting $C_n$. The add-on 'asterisks' marked permutation elements appeared and disappeared without a residual trace. It's a ghost-like phenomenon, and hence these add-on asterisk-marked elements will be referred to as 'ghosts', and the process of upgrading the original plaintext, $P_n$ to the 'ghost dressed' plaintext $P^g_n$ will be referred to as 'ghost dressing'. The reverse processing, namely $P^g_n \rightarrow P_n$ will be referred to as 'ghost washing' or 'ghost scrubbing'. And similarly, the process of removing the ghosts from $C^g_n$ to yield $C_n$ will be referred to as ghost washing.

Should we wish to emphasize that a plaintext, or a ciphertext are 'ghost washed' we would indicate:
$P_n = P^g_n$, and $C_n = C^g_n$.

In the example above $C^g_n = XUWVZY$. So the net action was to transpose $P_n = UVWXYZ$ to $C_n = XUWVZY$.

2.2.2.1 Properties of Ghost-Dressing

The value of g (the count of ghosts), and the configuration in which these g elements intermix with the original elements, will be regarded as ghost key: G. We will also write: $|G| = g$. There should not be any confusion marking individual ghosts as: $g_1, g_3, \ldots g_g$.

A ghost-dressed permutation of P would require an encryption key comprised of the value of the remover, R, and the information in G.
$K_{permutation\ encryption} = (G, R)$ To decrypt the corresponding ciphertext, C, one would need to be in possession of (G,R).

20.2.2.2. Using Ghost Dressing to Upgrade Incomplete Keys to Complete Keys

Consider an n elements permutation, $P_n$, encrypted via an Incomplete-Transposition Algorithm (ITA), operating with an incomplete key $K^i_n$, such that $|K^i|_n < n!$, where n is the number of elements in the transposition. Let us further require that:
$|K^i|_m < |K^i|_n \ldots$ for any $n > m$ Namely that the key space increases in size when the size of the transposed list is growing.

One could ghost-dress $P_n$ with g ghosts to form a list of size (n+g) elements, $P^g_{n+g}$. Applying the Incomplete Transposition Algorithm (ITA) on $P_{n+g}$ one would operate with a key space of size $|K^i|_{n+g}$.

The number of ghosts used, g, may be set so high that the following becomes true:
$|K^i|_{n+g} > n!$ And in that case it is possible that the corresponding permutations of the washed-out ciphertext, will be n!.

We can say then that the there can be an incomplete transposition algorithm that can be rendered complete by using the ghost-dressing process.

And now we would wish to show that a particular incomplete transposition algorithm, namely the sieve algorithm, will indeed be rendered into a complete transposition algorithm using ghost dressing.

2.2.2.3 Ghost Dressing the Sieve Transposition Algorithm

The sieve transposition algorithm was shown to be incomplete, and to command a smaller and smaller fraction of the complete key space as the size n of the permutation increases. We have also shown that the ghost-dressing process may be applied to such degree as to allow an incomplete transposition algorithm to become complete. Alas, it is not clear yet whether applying ghost-dressing to the sieve transposition algorithm will succeed in rendering the sieve algorithm into a complete transposition algorithm.

We shall first offer some illustration for ghost-dressing the sieve transposition algorithm and then offer a proof that the ghost-dressed sieve algorithm is indeed complete. Finally, we shall discuss a few properties thereto.

2.2.2.3.1 Illustration (Ghost-Dressed Sieve Transposition Algorithm)

Let us examine the plaintext $P_4 = XYZW$. Using the remover, $R = 1, 2, 3, \ldots$ we compute only 12 distinct permutations.

| C | R |
|---|---|
| XYZW | 1 |
| YWZX | 2 |
| ZYWX | 3 |
| WXZY | 4 |
| XZWY | 5 |
| YXWZ | 6 |

-continued

| C | R |
|---|---|
| ZWXY | 7 |
| WYXZ | 8 |
| XWYZ | 9 |
| YZXW | 10 |
| ZXYW | 11 |
| WZYX | 12 |

Per our analysis above we have $B_4=1*2*3*2=12$, since 12 is divided by 1, 2, 3 and 4. The total number of permutation is 4!=24, and hence the sieve transposition algorithm over 4 elements transposition covers 50% of the space. And it can be readily checked that:
C(R)=C(R+B)=C(R+12)

The sieve encryption shows a period of 12.

We shall now ghost dressed P with a single ghost. Writing: $P^g$=*XYZY. The ghost-dressed plaintext has a period of $B=2*3*2*5=60$, which is quite larger than the space of complete transposition of n=4 elements (which is 4!=24), so it is possible for this ghost-dressed plaintext to be encrypted into the full range of the original 4 element. When we encrypt $P^g$ with the range of removers R from 1 to 60 we tally: (each ciphertext is followed by its generating remover).

*XYZW 1; XZ*WY 2; Y*WXZ 3; ZYWX* 4; W*YZX 5; *YXWZ 6; XW*YZ 7; YXWZ* 8; ZWY*X 9; WXY*Z 10; *ZXYW 11; X*WZY 12; YZW*X 13; Z*YXW 14; WYXZ* 15; *WXZY 16; XYW*Z 17; YWZX* 18; ZXYW* 19; WZX*Y 20; *XWYZ 21; XZWY* 22; Y*ZWX 23; ZYX*W 24; W*XYZ 25; *YWZX 26; XWZ*Y 27; YXZ*W 28; ZWXY* 29; WX*ZY 30; *ZWXY 31; X*ZYW 32; YZXW* 33; Z*XWY 34; WY*XZ 35; *WZYX 36; XYZW* 37; YWX*Z 38; ZX*YW 39; WZ*YX 40; *XZWY 41; XZY*W 42; Y*XZW 43; ZY*WX 44; W*ZXY 45; *YZXW 46; XWYZ* 47; YX*WZ 48; ZW*XY 49; WXZY* 50; *ZYWX 51; X*YWZ 52; YZ*XW 53; Z*WYX 54; WYZ*X 55; *WYXZ 56; XY*ZW 57; YW*ZX 58; ZXW*Y 59; WZYX* 60;

All in all: 60 distinct permutations. When we ghost-wash these permutations we indeed extract all the 24 permutations that cover the entire key space for n=4 permutation elements. So in this example, ghost-dressing the plaintext with a single ghost allowed for the sieve algorithm, powered by ghost-dressing to function as a complete transposition cipher.

However: considering P=UVWXYZ, the complete permutation key space is 6!=720. Alas for $P^g$=*UVWXYZ, the value of $B=1*2*3*2*5*1*7=420$, which is much smaller than the key space of 6!=720, there is no chance that the combined Sieve algorithm and a single ghost will cover the range needed for complete transposition. Indeed, applying the sieve transposition algorithm to $P^g_6$ one generates only 356 distinct permutations (<420).

Our next step is to increase the number of ghosts. Let's use $P^g_6$=**UVWXYZ. The respective B value is: $1*2*3*2*5*7*2=840$. Since 840>6! we have a theoretical chance to achieve that way a complete permutation. Alas, running all 840 keys, then ghost washing the resultant ciphertexts one logs only 471 distinct permutations:

UVWXYZ UVWYXZ UVWYZX UVWZXY UVXWYZ UVXWZY UVXYZW UVYWXZ UVYWZX UVYXWZ
UVYZWX UVYZXW UVZWXY UVZXWY UVZXYW UWVYZX UWVZXY UWVZYX UWXVYZ UWXYVZ UWXYZV
UWXZVY UWXZYV UWYVXZ UWYVZX UWYXVZ UWYXZV UWYZXV UWZVXY UWZVYX UWZXVY UWZYXV
UXVWYZ UXVYWZ UXVYZW UXVZWY UXVZYW UXWYVZ UXWZVY UXYVWZ UXYWVZ UXYWZV UXYZVW
UXYZWV UXZVWY UXZYVW UXZYWV UYVWXZ UYVZWX UYVZXW UYWVXZ UYWVZX UYWXZV UYWZVX
UYWZVX UYWZXV UYXVWZ UYXZWV UYZVWX UYZVXW UYZWXV UYZXVW UZVWXY UZVWYX UZVXWY
UZVXYW UZVYWX UZVYXW UZWVXY UZWVYX UZWXVY UZWXYV UZXVWY UZXVYW UZXWVY UZXWYV
UZYVWX UZYWVX UZYWXV VUWXYZ VUWYXZ VUWYZX VUWZYX VUXWYZ VUXYWZ VUXZWY VUYXWZ
VUYXZW VUYZWX VUYZXW VUZWXY VUZWYX VUZXWY VUZYWX VUZYXW VWUXYZ VWUYXZ VWUZYX
VWXUYZ VWXUZY VWXYZU VWXZUY VWXZYU VWYUXZ VWYXUZ VWYXZU VWYZUX VWYZXU VWZUXY VWZYXU
VXUWYZ VXUYZW VXWUYZ VXWUZY VXWYUZ VXWZYU VXYWUZ VXYWZU VXYZUW VXYZWU VXZYWU
VYUWXZ VYUWZX VYUXWZ VYUZWX VYUZXW VYWUXZ VYWXUZ VYXUWZ VYXWUZ VYZWUX VYZXUW
VYZWU VZUXWY VZUXYW VZUYXW VZWUXY VZWUYX VZWXUY VZWYUX VZXUYW VZXWUY VZXWYU
VZYUWX VZYUXW VZYWUX VZYXUW VZYXWU WUVXYZ WUVXZY WUVYZX WUVZXY WUXYVZ WUXYZV
WUYVXZ WUYXZV WUYZVX WUYZXV WUZVXY WUZXYV WVUXYZ WVUXZY WVUYXZ WVUYZX WVUZXY
WVXUYZ WVXUZY WVXYZU WVXZYU WVYXZU WVYZUX WVYZXU WVZUXY WVZUYX WVZXYU WVZYXU
WVZYX WXUVYZ WXUVZY WXUYVZ WXUYZV WXUZVY WXUZYV WXVUYZ WXVUZY WXVYUZ WXVYZU WXYZUV
WXYZVU WXZUVY WXZUYV WXZYUV WYUVXZ WYUVZX WYUXZV WYUZVX WYVUXZ WYVUZX WYVXUZ
WYVXZU WYZUV WYZUX WYZUXV WYXVUZ WYXZUV WYZUVX WYZUXV WYZVXU WYZXUV WZUVXY
WZUVYX WZUXVY WZUXYV WZUYXV WZUYXV WZVUXY WZVUYX WZVXUY WZVXYU WZVYUX WZXYUV WZXYVU
WZYUVX WZYVXU WZYXUV XUVWYZ XUVYWZ XUVYZW XUVZWY XUVZYW XUWYVZ XUWYZV XUWZYV
XUYVZW XUYVWZ XUYWVZ XUYWZV XUYZVW XUYZWV XUZWVY XUZYVW XVUWYZ XVUYZW XVUZYW
XVWUYZ XVWZUY XVWZUY XVWYUZ XVWYZU XVZWUY XVZWYU XVZYUW XVZYWU XWUVYZ XWUVZY
XWUYVZ XWUYZV XWUZVY XWVUYZ XWVUZY XWVYUZ XWVYZU XWVZUY XWVZYU XWYUZV XWYVUZ XWZUVY
XYUVWZ XYUWVZ XYUWZV XYUZVW XYUZWV XYVUWZ XYVZUW XYVZWU XYZUVW XYZUWV XZUVWY
XZUWVY XZUWYV XZUYVW XZUYWV XZVUWY XZVWUY XZVYUW XZVYWU XZWUVY XZWVUY XZYUVW
XZYVUW XZYVWU YUVWXZ YUVWZX YUVXZW YUVZWX YUVZXW YUWVXZ YUWVZX YUWXZV YUWZVX
YUXVWZ YUXVZW YUXZVW YUXZWV YUZVWX YUZVXW YUZWVX YUZWXV YUZXVW YUZXWV YVUWXZ
YVWUXZ YVWXUZ YVWXZU YVWZUX YVWZXU YVXUWZ YVXZUW YVXZWU YVZUXW YVZWXU YVZXUW
YVZXWU YVZXWU YWUVXZ YWUVZX YWUXZV YWVUXZ YWVZUX YWVZXU YWXVUZ YWVZXU YWZUXV YWXVUZ
YWXVZU YWZXUV YWZUVX YWZVUX YWZXVU YWZXVU YWZUVX YWZUXV YWZVXU YXVWUZ YXWUVZ
YXZUVW YXZWUV YXZWVU YXWZVU YZVWUX YZVXUW YZVWXU YZVXUW YZVXWU YZWVUX YZWVXU YZWXUV
YZXVUW YZXVWU YZXWUV ZUVWXY ZUVWYX ZUVXWY ZUVXYW ZUVYXW ZUVYWX
ZUWVYX ZUWXVY ZUWVYX ZUWYXV ZUXVWY ZUXVYW ZUYVWX ZUYVXW ZUYWVX ZUYXVW ZUYXWV
ZVUWXY ZVUWYX ZVUXWY ZVUYXW ZVUYWX ZVWUXY ZVWUYX ZVWXUY ZVWYXU ZVXUYW ZVXWUY
ZVXWYU ZVYUWX ZVYWU ZVYXUW ZVYWU ZWUVYX ZWUXVY ZWUXYV ZWVUYX ZWVXYU ZXUVWY
ZXUVYW ZXUWVY ZXUWYV ZXUYVW ZXVUWY ZXVUYW ZXVWUY ZXVWYU ZXWUVY ZXWVUY ZXWVYU

-continued

ZXWYVU ZXYUVW ZXYUWV ZXYVUW ZXYVWU ZXYWUV ZXYWVU ZYUVWX ZYUWVX ZYUXWV ZYVUWX
ZYVUXW ZYVWUX ZYVXWU ZYWVUX ZYWVXU ZYWXVU ZYXUWV ZYXVUW ZYXWUV ZYXWVU

We may try a different configuration: $P^g_6$=UV*WX*YZ, upon repeating the above with this configuration we log 506 distinct permutations—still short of the full space of 720. Trying $P^g_6$=*UVWXYZ*, one yields only 470 distinct permutations, and for $P^g_6$=UVWXY**Z one yields 492 distinct permutations. For U*VWXY*Z, the number is again 506.

Climbing up to g=3, the yield is a bit higher, but still not enough. The following table shows various configurations of three ghosts, and the number of distinct ghost-washed ciphertexts they log:

| | |
|---|---|
| ***UVWXYZ | 515 |
| UV*W*X*YZ | 533 |
| UVW***XYZ | 529 |
| U*VW*XY*Z | 542 |
| *UVW*XYZ* | 549 |

Chasing the 'complete transposition' status, we up the ante and use 4 ghosts in various combinations:

| | |
|---|---|
| ****UVWXYZ | 658 |
| U*V*W*X*YZ | 686 |
| *UVW**XYZ* | 663 |
| *U**VWXY*Z | 679 |

The results, as expected are much higher, much closer to the target of 6!=720, but not quite. And despite the fact that $B_{6+4}$=1*2*3*2*5*1*7*2*3=1260, which is much larger than 6!. The response is to go even higher, use g=5. Now we have $B_{6+5}$=1*2*3*2*5*1*7*2*3*1*11=13,860, which is overwhelmingly larger than 6!. And indeed now the completeness status is achieved for P=*****UVWXYZ, the washed up distinct ciphertexts counts exactly 6!=720. The reason for this phenomenon is that many ghost-dressed up permutations collapse to the same permutation at the ghost-washed stage.

2.2.2.3.2 Proof of the Sieve Transportation Completeness (STC) Theorem

Overview: The proof will be based on induction: assuming the Equivoe-T completeness theorem is true for transposing (n−1) elements. We shall then prove its validity for n transposing elements. For a given pair of $P_n$ and $C_n(P_n, C_n)$, and for a particular $t_{ij}$, we shall identify a corresponding $C_{n-1}$=$t_{*,1}$, $t_{*,2}$ . . . $t_{*,(i-1)}$, $t_{*,(i+1)}$ . . . $t_{*,n}$ namely $C_{n-1}$ will be $C_n$ with element $t_{ij}$ removed from it. And a corresponding:

$P_{n-1}$=$t_{1,*}$, $t_{2,*}$, . . . $t_{i-1,*}$, $t_{i+1,*}$ . . . $t_{n,*}$ namely $P_{n-1}$ will be $P_n$ with element $t_{ij}$ removed from it.

We assume that ($P_{n-1}$, $C_{n-1}$) satisfies the STC theorem. We shall now choose a particular G pattern, namely ghost-dress $P_{n-1}$ and $G_{n-1}$. Next we will be looking for a single ghost that has a particular position in $P_{n-1}{}^g$, and a particular position in $C_{n-1}{}^g$, such that when we replace it with entity $t_{ij}$, we shall turn $P^g_{n-1}$ to $P^g_n$, and turn $C^g_{n-1}$ to $C^g_n$.

When we subsequently wash clean $P_n{}^g$, and $C_n{}^g$ to $P_n$= $P_n{}^{-g}$, and $C_n$=$C_n{}^{-g}$ we shall have a ($C_n$, $P_n$) pair that is matched by a working key K=$K_n$, derived from $K_{n-1}$ that was used for ($C_{n-1}$, $P_{n-1}$). The value of the remover remains the same, the number of ghosts is reduced by one: |$G_n$|=|$G_{n-1}$|−1 (since one ghost was replaced by $t_{ij}$), and otherwise the ghost configuration (or mix) with the n−1 pre-ghosts elements is the same. Since $K_{n-1}$ is a good match to ($C_{n-1}$, $P_{n-1}$), $K_n$ will also match $C_n$ and $P_n$ because of the way $P_n$ and $C_n$ were constructed from $P_{n-1}$ and $C_{n-1}$.

This proof has a peculiarity: as n rises the number of ghosts drops, so if this induction is to be used up to a given value of n, then for n=1, the number of ghosts will have to be at least n.

This is the overall structure of the proof. To complete it, it is necessary to show that there exists a ghost in $P^g_{n-1}$, and in $C^g_{n-1}$ such that it could be replaced by $t_{ij}$ such that $P^g_n$, and $C^g_n$ will be in the right order.

We shall shortly prove the existence of a replaceable ghost, but beforehand a small illustration.

Illustration

We are looking for an Equivoe-T (ET) key, $K_4$ to match between plaintext $P_4$=XYZW, and ciphertext $C_4$=ZYXW. $K_4$ such that $C_4$=ET ($P_4$, $K_4$)

Let's divide this task to finding a key $K_3$ to match $P_3$, and $C_3$ derived from the respective $P_4$, and $C_4$, by omitting the element X from each. Namely: $P_3$=YZW, and $C_3$=ZYW. We are looking then, for:

$K_3$ such that $C_3$=ET ($P_3$, $K_3$)

The logic of the above proof says that $K_3$ is available, but if not, then we shall 'step down' and look for $K_3$ by omitting an element from $P_3$ and $C_3$, and solving the respective $P_2$ and $C_2$ problem (looking for $K_2$).

$K_2$ such that $C_2$=ET ($P_2$, $K_2$)

So we omit element W and define $P_2$=YZ, and $C_2$=ZY If $K_2$ is not known either, we step another step down to the trivial case of $P_1$ and $C_1$:

$K_1$ such that $C_1$=ET ($P_1$, $K_1$)

We omit Z and end up with $P_1$=Y, $C_1$=Y.

This task (finding $K_1$) is trivial, and will work with every key. Alas, we remember that the key that we use will impact the key that will be used for transposing 2, 3, 4, and more entities, we may use a 'good' remover (not R=1 of course), and a large enough g=|G|$_n$. In the expressions ahead we shall denote the ghosts with small cap letters, and hence, we shall build the ghost-dressed $P_1$ to be:

$P^g_1$=abcdeYfghuv and choose R=23. Accordingly (applying the basic sieve transposition algorithm):

$C^g_1$=adhfuYbgcev

Of course when we ghost-wash the plaintext and ciphertext we get $P^{-g}_1$=Y and $C^{-g}_1$=Y, so the key ($K_1$) works.

We are ready now to build back. Let's look for a key $K_2$ that will encrypt $P_2$=YZ to $C_2$=ZY. According to our proof above, we are looking for a ghost that appears right of the element Y in the plaintext and appears left of the element Y in the ciphertext. The following ghosts satisfy this requirement: f, h, u. We can choose either one of these to be replaced by Z. Let's choose h. We now are looking for a key $K_2$ to convert $P_2$=abcdeYfgZuv to $C_2$=adZfuYbgcev. Applying R=23, this is exactly what happens:

(abcdeYfgZuv)$_{R=23}$→(adZfuYbgcev)

And when P and C are ghost-washed we end up with $P_2$=YZ and $C_2$=ZY. The ghost pattern above and the remover R=23 define a ghost-sieve key $K_2$ as desired (to encrypt YZ to ZY). We should now take the next step: finding $K_3$. To do so, we need to find a ghost that is right of Z for the plaintext, and right of Y for the ciphertext. That is because we wish to encrypt $P_3$=YZW to $C_3$=ZYW. Only one ghost qualifies: v. We therefore build $P_3$, and $C_3$ by replacing ghost v with element W, as follows:

$P_3$=abcdeYfgZuW; $C_3$=adZfuYbgceW

And indeed:

(abcdeYfgZuW)$_{R=23}$→(adZfuYbgceW)

Which now qualifies as $K_3$ because $P_3^{-g}$=YZW, and $C_3^{-g}$=ZYW.

Onward to $K_4$: Repeating the above procedure we look for ghosts that appear left of Y in the plaintext, and left of W in the ciphertext. That is because we wish to encrypt P=XYZW to C=ZYXW so we need to fit the X element before the YZW in the $P_3$ plaintext, and to fit the same element before element W in C. The ghosts: b, c and e qualify. We can replace either one of them with X. Let's pick c to be replaced by X:

$P_4$=abXdeYfgZuW; $C_4$=adZfuYbgXeW

And indeed:

(abXdeYfgZuW)$_{R=23}$→adZfuYbgXeW

Namely, we find $K_4$ that matches P=XYZW with C=ZYXW. $K_4$ is defined as follows: use a remover R=23 and use 8 ghosts distributed $g_1$=2, $g_2$=2, $g_3$=2, $g_4$=1, $g_5$=0. Namely: fit $g_i$ ghosts left of $t_{i*}$, for i=1, 2, 3, 4

Accordingly we ghost-dress P=XYZW to $P^g$=XY**Z*W, encrypt with R=23:

$C^g_4$=ZY**X*W=Equivoe-T (XY**Z*W)$_{R=23}$

And washing $C^g_4$ yields: $C_4$=ZYXW—the object of this illustration.

The Existence of a Replaceable Ghost

The premise of the above proof is to replace a ghost in a proper match of $P_{n-1}$, and $C_{n-1}$, with another element (the n-th). In the illustration that followed, such replacements were demonstrated. Alas, it is conceivable that such a replaceable ghost will not be found in the (n−1)-elements P and C. We shall therefore prove here below that there are sufficient steps to be taken in order to insure the existence of such a replaceable ghost. Once proven, the Sieve Transportation Completeness (STC) theorem will be fully proven.

We shall first build a mathematical vocabulary for our proof.

We shall mark the ghosts in $P^g_n$ as follows: the set of ghosts that are placed left of $t_{1*}$ will be designated as $G_{1*}$. The set of ghosts placed right of $t_{i-1*}$ and left of $t_{2*}$ will be designated as $G_{2*}$. And in general, the set of ghosts placed right of $t_{i-1*}$ and left of $t_{i*}$ will be regarded as $G_{i*}$. The set of ghosts that are placed right of $t_{n*}$ will be regarded as $G_{n+1*}$.

Clearly: $|G|=\Sigma G_{i*}$ for i=1, 2, ... n+1

We shall mark the ghosts in $C_n$ as follows: the set of ghosts that are placed left of $t_{*1}$, will be regarded, or designated as $G_{*1}$. The set of ghosts placed right $t_{*1}$ and left of $t_{*2}$ will be designated as $G_{*i}$. And in general the set of ghosts placed right of $t_{*n}$ and left of $t_{*i}$ will be regarded as $G_{*i}$. The set of ghosts that are placed right of $t_{*n}$ will be regarded as $G_{*n+1}$.

Clearly: $|G|=\Sigma G_{*i}$ for i=1, 2, ... n+1

Given $P_n$ and $C_n$ for which we search for an Equivoe-T key $K_n$, we shall pick an element $t_{ij}$ thereto and remove it from both $P_n$ and $C_n$. We assume that we can find the key $K_{n-1}$ to match the so constructed $P_{n-1}$, and $C_{n-1}$. The process will include the creation of the ghost-dressed plaintext and ciphertext: $P^g_{n-1}$, $C^g_{n-1}$. For these two mutual permutations we shall then list the set $G_{i+1*}$ which is comprised of all the ghosts left of $t_{i+1*}$, and right of $t_{i-1*}$ (we maintain the designation of the elements as assigned in $P_n$ and $C_n$).

Similarly we shall list the set $G_{*j+1}$ which is comprised of all the ghosts left of $t_{*j+1}$, and right of $t_{*j-1}$.

If $G_{i+1*} \cap G_{j+1*} \neq 0$ then it means that at least one ghost is found in both sets, and that ghost can be replaced with $t_{ij}$ and allow one to derive $K_n$ from $K_{n-1}$. This derivation is simple: apply $K_{n-1}$ to $P_n$ (using the same remover, R, and the same ghost-dressing except for the ghost that was replaced by $t_{ij}$). If no shared ghost is found in $G_{i+1*}$ and $G_{*j+1}$, then we shall check all other values of i=1, 2, ... n each with its respective j=1, 2, 3, ... n. If for any $t_{ij}$ we have:

$G_{i+1*} \cap G_{*j+1} \neq 0$ then the method works because it does not matter which of the n elements in $P_n$ and $C_n$ is the one to remove, then to re-introduce.

One may recall that for $P_1$ and $C_1$ where element $t_{11}$ is transposed to itself $t_{11}$, one can pick any remover R=1, 2, ... and any number of ghosts $|G|$=g=1, 2, 3, 4 ... and one may further note that the value of the initial R remains the same throughout the induction process, while the value of $|G|$ is decremented by one, each round of the induction. It figures then that the $P^g_{n-1}$ and $C^g_{n-1}$ will experience elements $z_{ij}$ with a random-like matching of i and j. Therefore, for a given ghost g' that is part of $G_{i*}$, the chance for not being found in $G_{*j}$ is n/n+1, since all the $|G|$ ghosts are divided into n+1 sets. And the chance for no ghost among the $|G|$=g ghosts to be found at the matching set in the ciphertext is $(n/n+1)^g$. Since g is a free choice, one may pick it so high to reduce the chance for an impasse (not finding a replaceable ghost) to a level sufficiently small that it would not happen. Of course, the required g value will be higher for higher values of n.

This analysis suggests an operational procedure wherein given a $P_n$ and $C_n$, one could first spread some g ghosts around $P_n$, and check it out with a few or more removers, R. If it works, then mission accomplished: a key $K_n$ is found. Otherwise one would switch to a related simpler problem: to find a key for a pair of $P_{n-1}$, $C_{n-1}$ that are constructed by eliminating one element from $P_n$ and $C_n$. This related problem can also be tried per se, choosing several removers in turn, and large enough number of ghosts variably intermixed with the elements. If it works, then one climbs from back to the $P_n$-$C_n$ original problem, and solves it as indicated herein.

If the $P_{n-1}$, $C_{n-1}$ does not lead to a direct solution, then one switches again to a simpler but related problem with a plaintext and a ciphertext of size (n−2) elements. Again the smaller plaintext and ciphertext are constructed by removing an element from the larger sets of plaintext, ciphertext. And similarly, if necessary, one switches again and again to plaintext-ciphertext pairs of fewer and fewer elements. If at some point m<n a straight solution is found, then one climbs up from that level, (m), tracing back up the former down-switching of problems, until one climbs back to the pair $P_n$-$C_n$ and resolves his or her original problem.

Such a successful m level can be counted on to show up, because for m=1 any remover and any number of ghosts at any configuration will work. And then the climbing up begins.

This procedure is without a guaranteed final length, but it does never encounter a 'stop' sign, so sooner or later a matching key, $K_n$ will be found, regardless of how large n may be. The object of this procedure is to prove that a solution in terms of a matching key $K_n$ to any pair $P_n$ and $C_n$ is always achievable.

This procedure of solving a challenge A with related, but easier, challenge A', and repeating that process until a solvable challenge is found, and from then on climbing back—was recognized as a generic problem solving technique. See ref [Samid 2010].

3.0 APPLICABILITY & USAGE

Equivoe-T may be used for low-entropy messages, medium, and high-entropy plaintexts. Of course, the higher the entropy the more powerful the cipher. This is different from a typical symmetric cipher where other than a completely randomized plaintext, the cryptanalysis enjoys zero equivocation. Using DES, or AES for example, a sufficiently long ciphertext will point only to one grammar and dictionary compatible plaintext, and that plaintext is the one encrypted. An Equivoe-T user may encrypt a "broken English" payload, combine it with a perfectly written decoy and thereby thoroughly confuse the cryptanalyst. Of course, if the payload is highly randomized then even small randomized decoy will generate an enormous amount of equivocation.

We shall discuss below:
Generic Equivoe-T protocol
Non-textual Equivoe-T applications
Speed Considerations

3.1 GENERIC EQUIVOE-T PROTOCOL

The generic Equivoe-T protocol describes the process from the state where the sender identifies a message that is to be securely communicated to the designated recipient using unsecure channels, to the state where the intended recipients of the message accurately and securely receive it. The concepts involved in the protocol are: payload, decoy, ghosts, sieve, the remover, message frame.
Encryption
  Decoy Setting
  Ghost-Dressing
  Sieve Processing
  Ghost-Washing
Ciphertext Release
Decryption
  Frame Ghost Dressing
  Sieve Processing
  Frame Ghost Washing
  Plaintext Reconstruction
  Payload Interpretation 3.1.1 Encryption Encryption takes in the message to be protected, regarded as "the payload", and ends up with a plaintext of a larger size since it contains the payload and the decoy. The presence of the decoy is essential, or at least the expectation thereto.
Parts:
  Decoy Setting
  Ghost-Dressing
  Sieve Processing
  Ghost-Washing Decoy setting, as discussed, may be carried out automatically or manually. The larger the decoy the greater its induced equivocation; the smarter the decoy the greater its induced equivocation. The larger the decoy the more data there is to encrypt and decrypt, so an optimization is called for. The more critical the confidentiality of the message, the more liberal one should be with the decoy. Elsewhere, for pedagogical reasons the distinction between the payload and the decoy was made obvious and non-secret: "payload-separator tag-decoy", with the expectation for a permutation in the form: "decoy-separator tag-payload". Albeit, this construction may be part of the secret, the breakdown of the plaintext (comprised of the payload and the decoy) to its ingredients (the payload and the decoy) may be carried out via some subtle data processing, and in that case this separation should be part of the key definition, not the method definition. The payload and the decoy combine into the plaintext.

Ghost dressing, or "ghosting" is the process of dressing up the plaintext with g ghosts in a pre-agreed pattern. The ghosting pattern, G, is part of the Equivoe-T key. The result is a pre-transposition message of size p+d+g, where p is the size of the payload, d the size of the decoy, and g the number of ghosts. p, d, and g are all measured in the transposition units. These units are part of the design of the implementation. One could transpose bits, or bytes, or words, or phrases, or paragraphs, or files, or folders, etc. There are different considerations thereto. The output of this stage is the ghost-dressed plaintext.

The ghost-dressed plaintext is subsequently undergoing sieve processing, where a remover, R, part of the Equivoe-T key, operates on the ghost-dressed plaintext $P^g$ and generates the corresponding ghost-dressed ciphertext, $C^g$, which, of course is of the same size of: p+d+g The ghost-dressed ciphertext is then washed up, and all the ghosts are removed. This produced a permutation of the plaintext, of the same size: p+d. The result is the washed up ciphertext $C=C^{-g}$.

The $C^{-g}$ is now ready for release into an insecure channel on its way to the intended recipient.

3.1.2 Ciphertext Release

Once the encryption is concluded, the ghost-washed ciphertext is released. Depending on the implementation, the release can be to another layer of encryption using any other effective cipher. In that case this additional encryption will have to be decrypted before one could decrypt the transposition. Normally though, the ghost-washed ciphertext will be released into an insecure channel where adversaries will capture it, and go to work to blast it into its corresponding plaintext. We note that while the remover comes with a finite range, however large it may be, the ghost pattern is open ended. The ciphertext does not betray the size of the ghosting that generated it because all remnants of the ghosts are washed away before release.

3.1.3 Decryption
  Decryption proceeds as follows:
  Frame Ghost Dressing
  Sieve Processing
  Frame Ghost Washing
  Plaintext Reconstruction
  Payload Interpretation The intended recipient receiving the ghost-washed ciphertext $C^{-g}$ will need to reconstruct the plaintext in a form of an empty frame. That frame will have to be ghost-dressed to emulate the encryption process. An "empty frame" means that the plaintext will be reconstructed with 'place holders'. The first transposition element on the plaintext is $t_{1*}$. It can be written as "$t_{1*}$" without identifying what it is. Since the ciphertext is exactly the size of the plaintext, it is clear how many place holders will be needed. Ghost-dressing the empty frame is done as follows. The ghost-washed ciphertext is comprised of n transposition units (where n=p+d: payload plus decoy). (The decoy is defined together with any separators featured for the distinction payload-decoy). They are identified as $t_{*1}, t_{*2}, \ldots t_{*n}$.

The intended reader will now set n transposition units, as n "blanks" $t_{1*}, t_{2*}, \ldots t_{*n}$.

These n blanks will be ghost-dressed as agreed upon with the message writer: same number of ghosts, same pattern of mixing with the "place holders" in the plaintext. The result will be a 'frame ghost-dressed plaintext'. It is regarded as a frame because the various $t_{i*}$ are not identified.

Once the ghost-dressed plaintext frame is generated, it becomes subject to the SIEVE process that was used on it for the encryption process. Same remover, and same ghost pattern. Again, the SIEVE process operates on the "place holders" (blanks), the unidentified $t_{i*}$ for i=1, 2, 3, . . . n. The result of the SIEVE process is the ghost-dressed ciphertext frame: the ciphertext comprised of the blanks and the ghosts.

Next the ghosts are washed away from the ciphertext, yielding n "blanks" These blanks are ordered exactly as the order of the ciphertext sent to the intended reader by the writer of the message, the plaintext.

When this is done then each blank $t_{i*}$ sits in a particular location, spot j (j=1, 2, 3, . . . n) in the ciphertext frame, and hence one could write:

$t_{i*} = t_{*j} = t_{ij}$

Say, the element known an identified as $t_{*j}$ on the received ciphertext is now associated, fitted, as the element that is found in spot i in the plaintext. All the n elements in the received ciphertext are now fitted to their proper order in the plaintext, and the plaintext is thereby fully exposed.

Once the plaintext is fully exposed, it may be divided to the payload and the decoy according to the agreed upon rules of separation. Applying these rules, the intended recipient throws away the decoy and is left with the payload which the sender intended for him or her or it, to read.

3.1.4 Message Sizing

Given a plaintext message of length L (measured in units of choice: bits, bytes, words, etc.), one could apply Equivoe-T to the full message, and thereby unleash the full power of the transposition cipher. However, for sufficiently large L values the corresponding computational load may be prohibitive. It is therefore advisable, perhaps, to parcel the message out to n size blocks, and apply Equivoe-T to every block separately. One could repeat the same key for each block, or propagate to another key, based on some secret propagation formula, or use a pre-agreed random key. The smaller the size of the blocks, n, the less powerful the cipher because it carries less equivocation. Alas, this equivocation shortcoming can be overcome by supplying a liberal decoy for each block. Also the blocks don't have to be of same size. The Equivoe-T algorithm operates on any size block. One could use letters as permutation elements, and words, and whole sentences in one application. The Equivoe-T procedure does not specify uniformity of transposition elements. One could add to the "key" the information that describes how to parcel out a message of length L to sequential transposition elements. One could even use the power of Equivoe-T to 'scare' the cryptanalyst. A suspicion that a ciphertext was constructed with Equivoe-T will frustrate the cryptanalyst who will not know how extensively Equivoe-T was used. Perhaps L was parceled into two, or, say, five, or, ten parts that were transposed, or perhaps to blocks of 100 words each, or may be into letter size elements? Or perhaps Equivoe-T was not used at all, and the scary announcement is fake?

3.1.5 Obscurity

One could readily modify the SIEVE algorithm to induce more confusion and intractability for the adversary. For example, the remover could change directions alternately for its counting. Or it may switch direction every two or three rounds. It may change directions every time it hits an element that was in position i, where i, is, say, a prime number or $2^x$ number, or any other procedure. These switches may be specified as part of the key. The mathematical analysis offered for the basic sieve where the counting of the remover R elements proceeded in the same forward direction, is equally valid for a procedure where the direction of counting the remaining elements in the plaintext is changing once or as many times as desired. Obscurity can further be enhanced via a secret, and perhaps complex parceling out the full message for encryption L to sequential transposition cases (a case is data that is being divided to transposition elements on which Equivoe-T works). Then the parceling out of each transposition case to transposition elements may be done with great obscurity and non-uniformity.

3.1.6 Illustration

A passionate lover wishes to communicate to his friend the "hot" message "I love Lucy". Alas, the lover knows that jealous Nancy tries hard to read his messages, so he decided to use Equivoe-T, reasoning that in the worst case scenario, he could offer a decoy message that would get him out of trouble. To that end the lover constructs a decoy from the words: "Nancy", "Don't", "As if". The payload "I love Lucy" now becomes the payload plus the decoy, the plaintext:

P=love Lucy %X% Nancy Don't "As if"

The lover decides to use words as the permutation units so that his ciphertext which will properly decrypt to the plaintext, will equally well decrypt to:

P'=Nancy Love %X% Don't Lucy As if I and to:

P''=I Nancy Love %X% As if Don't Lucy and also to:

P'''=Lucy I Don't Love %X% Nancy As If

All of which are plausible plaintext candidates and this unresolved equivocation will save the day for this passionate lover.

The lover decides to use the familiar technique of a codebook, replacing each word with a letter code:

| word | code |
|------|------|
| I | X |
| Love | Y |
| Lucy | Z |
| % X % | S |
| Nancy | U |
| Don't | V |
| As if | W |

Accordingly the payload=XYZ, the decoy=UVW, and the separator is S. The plaintext is the concatenation of these three: P=XYZSUVW. The next step is to ghost-dress the plaintext:

Ghost Dressing:

P$^g$=*X*Y*Z*S*U*V*W*

(24 ghosts added to plaintext comprised of 7 elements).

Applying remover R=17 one computes:

C$^g$=*Y******V*U*WSX****Z and the ghost-washed ciphertext C$^{-g}$=YVUWSXZ, or in the original terms:

C$^g$=Love Don't Nancy As if %X% I Lucy

This ciphertext travels to the lover's friend, who now ghost-dresses the plaintext framework:

P$^g$=*1*2*3*4*5*6*7*

For convenience we replaced the symbol $t_{i*}$ with i. The numbers of the unknown permutation elements represent their order in the plaintext. The lover's friend knows that n=7 because that is the size of ciphertext. Now, the friend applies the secret remover R=17, which is known to her, and establishes $C^g$:

$C^g$=\*\*\*2\*\*\*\*\*\*\*\*6\*5\*7\*\*4\*\*\*\*1\*\*\*\*\*3 which she then ghost-washes to carve out $C^{-g}$=2657413

Comparing the communicated ciphertext C=YVUWSXZ to the sequence established from processing the frame, one gets: $t^*_1$=Y=$t_{2*}$=$t_{21}$. Similarly: $t_{*2}$=V=$t_{6*}$=$t_{62}$. And so on, one by one, the friend extracts the right plaintext P=XYZSUVW, which she translates to:

P=I love Lucy %X% Nancy Don't As if which she readily interprets by ignoring the separation sign and everything beyond it (being the decoy). What is left is indeed the payload: "I Love Lucy". The confidential communication was successfully accomplished.

The passionate lover wishes to be ready, should Nancy confront him with the ciphertext she snatched from the air. So he tries different plausible plaintext candidates to claim as the real plaintext:

Candidate 1: payload: "Nancy Love" decoy: Don't Lucy As if I, so the plaintext candidate becomes:

P'=Nancy Love %X% Don't Lucy As if I, or in the coded letters: P'=UYSVZWX.

Ghost dressing: P'$^g$=U\*Y\*\*\*\*SV\*Z\*\*W\*X\*, using R=3 he computes the ciphertext candidate to be:

$C^g$=Y\*V\*\*U\*\*W\*SX\*\*\*\*Z which is ghost-washed to: $C'^{-g}$=YVUWSXZ—exactly the ciphertext that was communicated between the lover and his friend. Making the candidate payload a viable option.

Candidate 2: payload: "I Nancy Love" decoy: "As if Don't Lucy" so the plaintext becomes:

P''=I Nancy Love %X% As if Don't Lucy or in coded letters: P''=XUYSWVZ. Ghost dressing: P''$^g$=XUY\*SWV\*\*\*\*\*\*\*\*Z, choosing remover R=19 and generating the respective ciphertext $C''^g$=YV\*U\*W\*S\*X\*\*\*\*Z\*

When it is ghost-washed it becomes $C''^g$=YVUWSXZ—again the very same ciphertext that Nancy captured (and that the lover sent to his friend): Equivocation.

Candidate 3: payload: "Lucy I Don't Love", decoy="Nancy As if", so the plaintext becomes:

P''' Lucy I Don't Love %X% Nancy As If

Or in coded letters: P'''=ZXVYSUW. Ghost dressing: P'''$^g$\*\*\*\*\*\*\*\*\*Z\*\*X\*V\*\*YSUW Choosing a remover R=757, and generating the respective ciphertext $C'''^g$=\*Y\*V\*\*UW\*\*S\*X\*\*Z\*\*\*\*\*, which when it is ghost-washed becomes: $C'''^{-g}$=YVUWSXZ—exactly the ciphertext which the lover communicated to his friend.

This illustration demonstrates how an Equivoe-T user, manually devised a decoy that allowed him to release a ciphertext that can be decrypted to the true plaintext P ("I Love Lucy"), but also to three other messages, "fake" plaintexts: P', P'', P'''. When challenged, the user will point, say, to P''' saying "Lucy I Don't Love" as the message he actually sent, and will readily show how he did it: what remover value he used, and what ghost dressing pattern he applied. There is no way for a cryptanalyst to credibly refute this claim. The procedural and mathematical means to relate the ciphertext to the true message are the same as those that relate the ciphertext to any of the fake messages (P', P'', P'''). One may note that the intended reader, holding the right key will know which message is the real one, and which is fake. Alternatively, a cryptanalyst, on her own, will extract the real message, the three fake ones, and several others, but will be unable to sort these candidates out, allowing for a residual equivocation to cloud any claim for cryptanalytic success.

3.2 NON-TEXTUAL EQUIVOE-T APPLICATIONS

Using Equivoe-T for graphics, pictures, audio and video media will call for the decoy to be splinter pieces of same media that will sow maximum confusion for the cryptanalyst. For example: voice pitch, and skewed vocalization will create ambiguity that can be resolved in more ways than one, so that it is not too clear what the user actually said. Same for pictures and forms.

3.3 SPEED CONSIDERATIONS

The Equivoe-T sieve is by its nature much faster in hardware and firmware implementation versus software. So Equivoe-T should perform well in speed competition. Unlike most ciphers Equivoe-T may gauge its computational load and optimize it between equivocation or entropy achieved, and performance speed. In a formal way one may consider the Equivoe-T key as comprised of: the division of the full communicated message to blocks that are individually treated with Equivoe-T, the division of each block to any combination of transposition elements (the elements may be vastly different from each other), the decoy, the Ghosting data, and the Remover value. None of these ingredients is permanently associated with the plaintext or the ciphertext. The plaintext and the ciphertext are of exactly the same size, which makes it very attractive for formal, structured, database implementations. All the above listed key components are the choice of the user. The decoy may be large or small, ghosting may be large or small—the g value and the configuration, and the remover value may also be large or small. In actual practice some of the ingredient categorized above as part of the Equivoe-T may in fact become part of the method (and be exposed) for convenience. For example, the method may include the size of the block to be individually treated with Equivoe-T, and the partition of each block to transposition elements.

In the extreme case Equivoe-T may be exercised with zero decoy, zero ghosting and a rather small remover value. A cryptanalyst may still find equivocation by analyzing the ciphertext, and knowing that Equivoe-T was used. Alas, if the cryptanalyst will find a plausible plaintext that may relate to the given ciphertext via the "zero" option implementation as described above, then the plausibility of this plaintext will soar and dwarfs however many other plausible plaintexts may be detected, all with non-zero Equivoe-T option.

It may be wise to use even the near-zero implementation option, (fastest, simplest) since any measure of entropy may be highly useful. A text or a database may be marked for grades of required security, and only the high security requirement sections will be Equivoe-T processed with a lot of entropy, using a large key (large smart decoy, large values for g (ghosts) and R (the remover)). The less sensitive parts will be Equivoe-T processed with a smaller key. This might offer a wise compromise between security and speed. This implementation will require a proper signal sent to the intended reader, so he or she can properly interpret the data stream coming their way.

Considering the decoy as part of the key is of special interest. Unlike other parts of the key that must be fully communicated between sender and recipient, the decoy may be devised by the sender without pre-knowledge of the recipient. The latter will simply apply the payload-decoy separation rules, and ignore the decoy, whatever it is, however large or small. It means then that the message sender may unilaterally decide to increase the security of a given message (better decoy) without prior consultation with the intended recipient. The sender might take into consideration speed, and free computing power.

4.0 CRYPTANALYSIS

Given a ciphertext known to have been produced via Equivoe-T, the de-facto key space is readily known, provided one knows what were the transposition elements that were used, and also what is the block size for each permutation round. As indicated, the Equivoe-T cipher may apply to letters, words, phrases, etc (even in a nested way). If those transposition elements are known and n is their count, then the key space for possible plaintexts is n!. If a proper decoy has been provided then a non-negotiable residual equivocation is the end state of the pure cryptanalysis.

One would expect though that to extract the plausible plaintexts from the ciphertext may be quite intractable. Unlike the Vernam cipher which offers equivocation galore, but offers a completely symmetrical easy encryption/decryption, Equivoe-T is operationally asymmetrical. The key is comprised of the remover (an integer of known range based on the value of n), and the ghosts: count and configuration—the combined variability is a formidable hurdle. It is therefore that while an Equivoe-T cryptanalyst faces residual equivocation when all is said and done, she also faces significant intractability to extract the various plausible plaintexts, and to insure that she listed them all.

The reason is that the Equivoe-T key is open-ended. There is no preset limit on G—the ghost count and configuration vis-a-vis the plaintext. And because of that one would expect that every (C, P) pair would be matched by an infinity of keys:

$K_1, K_2, \ldots$ etc.

All of which will encrypt a given P to a given C. And since the computational burden of Equivoe-T is proportional to (n+g), the size of the transposed combination, it would be easy to allow for a little bit more processing load, and not use the simplest key possible. For example: if the text for encryption is comprised of 250 words, it may be that g=400 will provide for a complete transposition, yet the message writer will use g=1000. This will increase processing time by factor of 5, and by g=2000 by a factor of 9. Unlike Vernam where larger keys require more shared information. The Equivoe-T key may be made as large as desired and all that is to be shared is the value of g, (the ghost count), and their intermix configuration with the plaintext. Such intermixing may be a detailed account of how many ghosts in each of the (n+1) ghost zones for the ghost-dressed plaintext, or it may be simple, e.g. half of the ghosts in zone $G_{1*}$, and half in $G_{n+1*}$. This option implies that even a very diligent and efficient cryptanalyst who will identify the series of keys that connect a pair of plausible plaintexts with the captured ciphertext: $K_1, K_2, K_3, \ldots$ will not be able to assume that the smallest key $K_1$ was the one used. This equivocation is meaningful for the case where the cipher user will re-use his key for some m independent messages. See analysis ahead.

In Vernam the size of the ciphertext betrays the size of the key. With Equivoe-T the size of the ciphertext conveys zero information about the size of the key. While n! (when n is the number of transposed elements) is the number of unique keys, the number of actual keys, is undetermined. Both the remover, R, and the ghosts, G can be as large as desired—more cryptanalytic equivocation.

4.1 RE-USE OF EQUIVOE-T KEYS

Consider the following: Given m messages $M_1, M_2, \ldots M_m$, all of them are regarded as plaintexts to be encrypted with Equivoe-T, using the same key, $K^M$. Their cryptanalyst, examining the respective $C_1, C_2, \ldots$ will attempt to find $K^M$ from the multiplicity of ciphertexts.

Assuming the cryptanalyst is all fast and all powerful, he would end up associating with each ciphertext, i=1, 2, ... m a set of, say, the p most plausible plaintext candidates (j=1, 2, ... p). Each of these plaintexts, will be found by this all powerful cryptanalyst to be associated with a series of k=1, 2, ... keys: $K_{ijk}$.

If the cryptanalyst finds for all ciphertexts, a given plaintext candidate that is associated with the same key: $K_{**k}$=K for all i=1, 2, ... m then this key is the likely true key used in all the m cases. However, the more complex the key, the more cryptanalytic effort will be needed to flash out the shared key.

Should the Equivoe-T cipher user, make use of some formula f to generate a different key for each of the m messages, then the intractability to extract this message will be very high because for every message i=1, 2, ... m every one of the $K_{i**}$ may be the key used and there are likely many plausible f functions that connect some entries in different messages—namely another source of built-in equivocation.

What is claimed is:

1. A method to transpose a plaintext list $P_n$ comprised of n elements to build a different permutation ciphertext C, to any of the possible n! permutations, using a secret key K comprised of a positive integer R greater than 1 and a positive integer g greater or equal to 1, the method comprising the steps of:

(i) constructing a list $P_{n+g}$ of (n+g) elements by placing g copies of ghost symbols within $P_n$ in a predetermined order, wherein the n elements in $P_n$ do not contain the ghost symbol, and n is greater or equal to 1; then (ii) counting R elements from the first element in the list $P_{n+g}$, wherein when the counting reaches the last element in the list $P_{n+g}$, the counting continues at the first element of the list $P_{n+g}$ as the next element in the counting; then (iii) identifying the element in the list $P_{n+g}$ where the counting of the R elements stopped, and removing that element to yield a new list $P_{n+g-1}$ comprised of (n+g−1) elements; then (iv) adding the removed element as a first element in a permutation ciphertext C; then (v) starting another count of R elements in the list $P_{n+g-1}$ from the next element of the removed element, wherein when the counting reaches the last element in the list $P_{n+g-1}$, the counting continues at the first element of the list $P_{n+g-1}$ as the next element in the counting; then (vi) identifying the element in the list $P_{n+g-1}$ where the counting of the R elements stopped, and removing that element to yield a new list $P_{n+g-2}$ comprised of (n+g−2) elements; then (vii) adding the removed element from the list $P_{n+g-1}$ as a new element in the permutation ciphertext C next to the first element; then (viii) recursively repeating the counting-removing-and-adding sequence for the next n+g−2 times to yield the permutation ciphertext C with n+g elements ($C_{n+g}$); then (ix) removing the g ghost symbol elements in the permutation ciphertext $C_{n+g}$, resulting in a permutation ciphertext $C_n$ of n elements.

2. The method of claim 1, further comprising the steps to reverse-transpose the permutation $C_n$ to the plaintext list $P_n$ by:

(x) creating a list of n elements, $P^{\#}_n$ as $P^{\#}_n = t_{1\#}, t_{2\#}, \ldots, t_{n\,\#}$, then (xi) placing g copies of the ghost symbols within $P^{\#}_n$, in the same way as in step (i) thereby creating a list of (n+g) elements, $P^{\#}_{n+g}$, then (xii) applying the process of steps (ii) through step (ix) to $P^{\#}_{n+g}$, resulting in a permutation of $C^{\#}_n$ denoted as $C'^{\#}_n$, where each element $t_{i\,\#}$ for i=1, 2, . . . n will be in position j, and written as $t_{ij}$, then (xiii) constructing the reverse-transpose of $C_n$ by placing element $t_{ij}$ in position i, for j=1, 2, . . . n.

3. The method in claim 1 wherein the direction of counting is altered in some pre-agreed pattern.

4. The method in claim 1 applied over a list plaintext $P_{n+m+1}$ comprised of n+m+1 elements constructed from a secret message $P_n$ comprised of n data elements, a subsequent marker symbol, followed by m data elements, which are regarded as decoy message, thereby constructing a permutation of $P_{n+m+1}$.

* * * * *